(12) United States Patent
Berg et al.

(10) Patent No.: US 7,675,821 B2
(45) Date of Patent: Mar. 9, 2010

(54) DEPLOYMENT OF SEISMIC SENSOR

(75) Inventors: Eivind Berg, Trondheim (NO); Johan Fredrik Näs, Trondheim (NO); Thore Persson, Kolnes (NO); Sven Magne Storesund, Haugesund (NO)

(73) Assignee: Seabird Technologies AS, Trondheim (NO)

( * ) Notice: Subject to any disclaimer, the term of this patent is extended or adjusted under 35 U.S.C. 154(b) by 0 days.

(21) Appl. No.: 11/084,277

(22) Filed: Mar. 18, 2005

(65) Prior Publication Data

US 2006/0002230 A1    Jan. 5, 2006

(51) Int. Cl.
*G01V 1/38* (2006.01)

(52) U.S. Cl. .......................................... 367/178; 367/15

(58) Field of Classification Search .................... 367/15, 367/16, 19, 149, 153, 173, 178; 181/110; 175/19
See application file for complete search history.

(56) References Cited

U.S. PATENT DOCUMENTS

| | | | | |
|---|---|---|---|---|
| 4,007,436 A * | 2/1977 | McMahon | .................. | 367/173 |
| 4,138,658 A * | 2/1979 | Avedik et al. | ................. | 367/15 |
| 4,300,254 A * | 11/1981 | Prior | .......................... | 114/331 |
| 4,442,916 A * | 4/1984 | Fair | ........................... | 181/120 |
| 4,446,537 A * | 5/1984 | Bowden et al. | ............... | 367/15 |
| 4,462,094 A * | 7/1984 | Bowden et al. | ............. | 367/173 |
| 4,516,227 A * | 5/1985 | Wener et al. | .................. | 367/15 |
| 4,780,863 A * | 10/1988 | Schoepf | ....................... | 367/15 |
| 4,838,379 A * | 6/1989 | Maxwell | ....................... | 175/19 |
| 4,870,625 A * | 9/1989 | Young et al. | .................. | 367/16 |
| 4,924,449 A * | 5/1990 | Guigne | ....................... | 367/104 |
| 5,007,031 A * | 4/1991 | Erich, Jr. | ...................... | 175/19 |
| 5,142,499 A * | 8/1992 | Fletcher | ....................... | 367/20 |
| 5,253,223 A * | 10/1993 | Svenning et al. | ............. | 367/178 |
| 5,442,590 A * | 8/1995 | Svenning et al. | .............. | 367/15 |
| 5,654,939 A * | 8/1997 | Bruengger et al. | .......... | 367/153 |
| 5,747,754 A * | 5/1998 | Svenning et al. | .............. | 367/17 |
| 6,456,565 B1 * | 9/2002 | Grall et al. | ..................... | 367/17 |
| 6,474,254 B1 * | 11/2002 | Ambs et al. | .................. | 114/312 |
| 6,612,397 B2 * | 9/2003 | Sparrevik et al. | ........... | 181/120 |
| 6,814,160 B1 * | 11/2004 | Scott | ............................ | 175/19 |
| 6,932,185 B2 * | 8/2005 | Bary et al. | ..................... | 367/15 |
| 6,975,560 B2 * | 12/2005 | Berg et al. | ..................... | 367/16 |
| 7,210,556 B2 * | 5/2007 | Bath et al | ..................... | 181/112 |
| 2003/0010404 A1 * | 1/2003 | Mossman et al. | ........... | 144/335 |
| 2003/0167997 A1 * | 9/2003 | Colyer | ......................... | 114/258 |
| 2003/0218937 A1 * | 11/2003 | Berg et al. | ..................... | 367/16 |
| 2005/0105391 A1 * | 5/2005 | Berg | ............................ | 367/15 |

\* cited by examiner

*Primary Examiner*—Scott A Hughes
(74) *Attorney, Agent, or Firm*—Emerson, Thomson & Bennett; Timothy D. Bennett, Esq.

(57) ABSTRACT

An arrangement for the deployment of seismic sensor units, such as sensor nodes (24), on the seabed includes a frame structure that is adapted to carry a container (11) for containment of a data registration unit and additional auxiliary equipment for the sensor node. The arrangement has supports (12, 13) that can rest against the seabed, and an attachment means (17) for a lifting hook, for raising and lowering by means of a crane. There is a holder (20) for the sensor node (24) that can be positioned on the seabed and which is connected to the container through a signal cable (32). A releasable attachment means (22) holds the sensor node (24) in a downwardly extending position with respect to the supports (12, 13). The attachment means (22) is located with a horizontal distance from the container (11). A latch mechanism (25) for the attachment means (22) is adapted to release the sensor node (24).

9 Claims, 3 Drawing Sheets

DEPLOYMENT OF SEISMIC SENSOR

This application claims priority from Norwegian Patent Application no. 20041900, filed May 7, 2004 which is incorporated herein by reference.

I. BACKGROUND OF THE INVENTION

A. Field of Invention

This invention relates to an arrangement for the deployment of seismic sensor units on the seabed.

B. Description of the Related Art

To perform seismic explorations in formations under the sea, a plurality of seismic nodes are arranged on the seabed, preferably in an orderly manner. These sensor nodes must be in contact with a solid medium, leading to requirements for the deployment operation. One such arrangement is provided in commonly owned Norwegian Patent Application no. 20025896 and corresponding U.S. Pat. No. 7,324,406 which are hereby incorporated by reference. With this arrangement a remotely operated registration and reporting unit is connected to each sensor node, for telemetric transmission of data to a control center located in an above-water receiver. In another embodiment of the same idea, the registered data is transferred either by physically removing the storage medium, or by transferring the data on the storage medium through a temporary, externally connected cable connection.

For the deployment of a plurality of such sensor nodes, each sensor node is provided with a handle or a bracket that can be grabbed by the gripping means of a remotely operated vehicle (ROV) or a remotely operated tool (ROT). Each sensor arrangement, comprised of a sensor node with accompanying data registration unit and auxiliary equipment, is then lowered onto the seabed with a crane. Under good conditions, the surface vessel can control the position of the deployment with an accuracy of within a few meters. An ROV is then used primarily for moving the sensor node from a position on the sensor arrangement to a free position. The ROV may also be used to correct the position of the sensor arrangement and to release the crane attachment. In this operation, the ROV may be used to arrange the sensor node in the correct position.

This may function well in shallow waters, but becomes less effective with poor visibility and a soft seabed. At zero visibility, it is difficult to evaluate an uneven seabed, and how deep a sensor node has been inserted. Furthermore, the seabed may have become softer due to whirling of the bottom, something which can affect the positioning accuracy, and the quality of the mechanical connection between the sensor node and the seabed. It is undesirable if the sensor node cannot be deployed with a defined orientation of the main axis, which is vertical in practice.

Influence from currents, for instance due to river mouths, strong wave motions, bad weather, and an inclined seabed, may cause the inaccuracy to increase. The use of an ROV will generally involve risk of damage, which will increase in poor deployment conditions.

In an alternative method, an ROV can be used to grab the sensor arrangement, with the sensor node attached, while the arrangement is hanging in the water from a crane hook. It may then land the parts on the seabed in the manner described above. If the visibility is poor, and limited to a few meters above the seabed, this method will allow the ROV to grab the sensor arrangement under good visibility conditions. However, if the crane does not compensate for the sea condition, the suspended sensor arrangement will move up and down, whereas the ROV lies steady in the water. Depending on the sea conditions, such use of an ROV may result in severe damage to the sensor arrangement. This embodiment is burdened with the same drawbacks as mentioned above, with regard to the deployment of the sensor nodes on the seabed, under poor visibility and soft seabed.

It is known to form a carrier frame with attachment means for a lifting hook, with a detachable attachment means for a sensor arrangement with registration and reporting equipment, as well as a holder for a sensor node. In this case, the sensor node is sucked into place on the seabed, and a twisting mechanism is used to reduce the required suction, so that the contact area against the seabed is not ruined by cavitation. This equipment is complex, difficult to operate, and burdened with the problems related to the deployment by means of an ROV or ROT. Furthermore, the usefulness of the method will be limited by the shearing strength, density, and the sedimentary characteristics of the seabed in question.

II. SUMMARY OF THE INVENTION

The main object of the invention is to provide an arrangement for the deployment of sensor nodes, which substantially reduces the disadvantages of known equipment and methods. More specifically, it is an object to provide such an arrangement, which can deploy sensor nodes in an easy, accurate, repeatable, and damage-free manner. By the word "accurate" it is meant both the position on the seabed, and the insertion into the seabed, particularly with regard to the vertical orientation.

Another object is to provide an arrangement which is easy to use and which can reduce expenses compared to the use of an ROV, which is also effective in poor visibility.

With such an arrangement, one can deploy sensor nodes in a satisfactory manner, without the use of an ROV, or by using a simple ROV as surveillance equipment. This reduces wearing and damage risk both on the deployed equipment, and on the deployment equipment. In addition, the invention makes it possible to perform a quicker deployment than is possible with known equipment. The deployment can take place with satisfactory positional accuracy, even at zero visibility, and with an inclined seabed.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
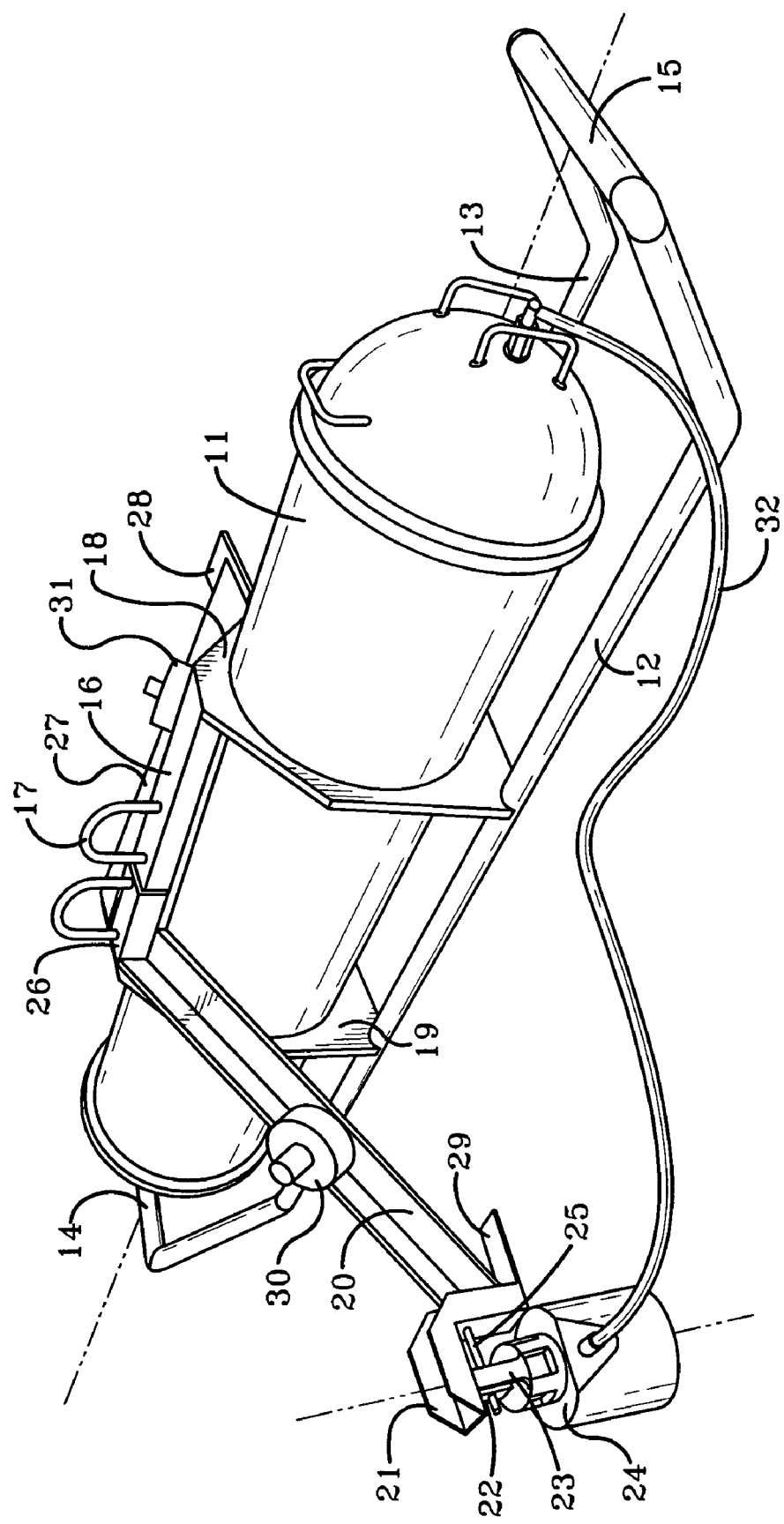
FIG. 1 is a perspective view of one embodiment of this invention.

FIG. 1 illustrates a cylindrical container 11, having a longitudinal main axis, that contains registering and reporting equipment and a power supply for the operation of a submerged sensor node. The container 11 is supported by two parallel skids 12, 13, which are made of a pipe material and which have upwardly bent ends 14, 15, that are connected to each other. A yoke 16, having a lifting bow 17, is coupled to the top side of the container 11. The yoke 16 is coupled to the container 11 with rings 18, 19, which encircle the container 11 at each end of the yoke.

On one side of this structure, a carrier arm 20 extends outwardly. The carrier arm 20 has an inner end that is removably attached to the yoke 16 and an outer end that carries an outwardly extending bracket 21. At its underside, the bracket 21 has a downwardly extending releasable fastener 22 for coupling to a carrier bracket 23 located on the top of a sensor node 24. The carrier bracket 23 can be arranged for gripping by a remotely operated vehicle (ROV) or a remotely operated tool (ROT) so that the sensor node 24 can be moved by means of such an auxiliary device.

The releasable fastener 22, which is biased with a mechanical spring (not shown), comprises a latch pin 25 that can be pulled out with a wire (not shown) to release the sensor node 24 when the carrier arm 20 is to be pulled up.

The carrier arm 20 is releasably coupled to the yoke 16 with an upside down U-clamp 26, which is held in position by a remotely releasable locking means (not shown).

From the U-clamp 26 extends another carrier arm 27. This is similar to the carrier arm 20, and is located symmetrically to this about the main axis. At the outer end of the carrier arm 27, a horizontal support plate 28 is mounted. This comes into contact with the seabed as the sensor node 24 penetrates the seabed. The outer end of the carrier arm 20 has a similar horizontal support plate 29. The vertical placing of the plate 29 is such that it comes into contact with the seabed, when the lower part of the sensor node has been inserted into the seabed. The respective areas of the support plates are chosen so that the area-moment of the support plate 28, about the main axis, is approximately the sum of the area-moment of the support plate 29 and the sensor node 24, when the lower part of this is inserted into the seabed. Replaceable weights 30 and 31 can be attached to each carrier arm 20 and 27, to adapt the overall system weight when in water, to the solidity and density of the seabed in question. It also helps to balance the structure about the main axis. This solution ensures that the sensor node 24 is forced vertically into the seabed, and that the U-clamp 26 is not jammed to the yoke 16 when these are separated from each other.

The overall system, including the container 11, the carrier arm 20, and the sensor node 24, is deployed either with a wire or with a cable. Depending on the type of connection from the system to the sea surface, the actuators may be acoustic triggered mechanical springs, electric, hydraulic.

The sensor node 24 is connected to the container 11 through an acoustically insulated signal cable 32. This may serve as a lifting means when the sensor nodes are collected. The signal cable 32 is of adequate length to avoid tightening when the sensor node 24 is inserted into the seabed.

Deployment

When deploying, the illustrated equipment is lowered to the chosen position. The position can be determined precisely in a coordinate system with a GPS. The weight of the apparatus that will be lowered can be adapted according to the seabed conditions, so that the sensor node 24 is forced down with sufficient force. With a two-axis inclinometer, the orientation of the sensor node 24 can be monitored, so that it is inserted with an accurate vertical axis. If the orientation of the sensor node 24 is considered to be acceptable, the latch pin 25 is pulled out without a change of position, and the carrier arm 20 can be lifted up so that the area adjacent to the sensor node is not disturbed.

Use of a cable as a lowering means makes it possible to use lights, a camera, and a supply of power to power-requiring equipment.

Figure 2:
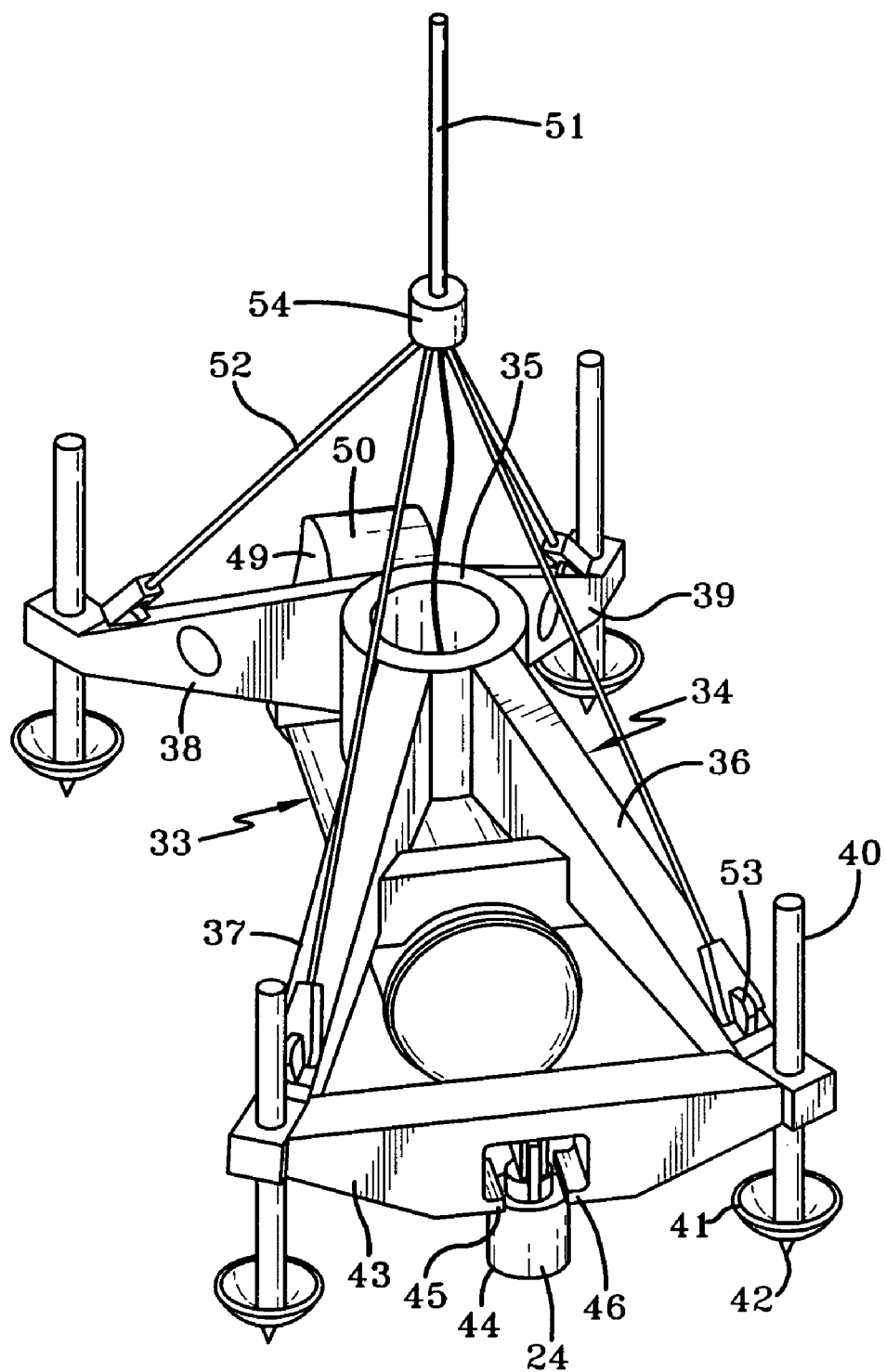
FIG. 2 is a perspective view of a second embodiment of this invention.

FIG. 2 illustrates an alternative embodiment of a sensor arrangement including a container 33 that corresponds to the container 11 shown in FIG. 1. Container 33 can be identical to container 11. The container 33 is attached beneath a deployment frame 34. The deployment frame 34 has a central stem 35, which is in the shape of a short, tube-formed part with a vertical axis, with four lateral extending arms 36, 37, 38, and 39 that extend pairwise in opposite directions, with a mutual angle between the arms in each pair 36, 37 and 38, 39. At the end of each arm 36, 37, 38, 39, a bar-shaped, vertically oriented leg 40 is arranged, with a shoe 41 at a pointed end 42. The legs 40 can be connected to a motor (not shown), which can be controlled for individually raising and lowering the legs. In this manner, one can position the deployment frame 34 horizontally on an inclined seabed. Alternatively, the legs 40 can be released with a remotely controlled latch for each leg, so that they fall down onto the seabed. Then the latches can be reactivated, so that the deployment frame 34 stays horizontal until it is to be lifted away.

As an alternative to the illustrated shoes 41, other support means, which are adapted to the seabed conditions in question, can be used.

The deployment frame 34 has a crossbeam 43 between two of the arms 36, 37 at one end. The crossbeam 43 may for instance be formed with a case profile with a central, downward facing recess 44. The recess 44 has two opposite flanges 45, 46 at the lower edge, that extend into and define an opening that gives room for the upper part of a sensor node 24 as described in connection with FIG. 1. When deploying, the flanges 45, 46 bear against the upper side of the lower part of the sensor node 24.

Figure 3:
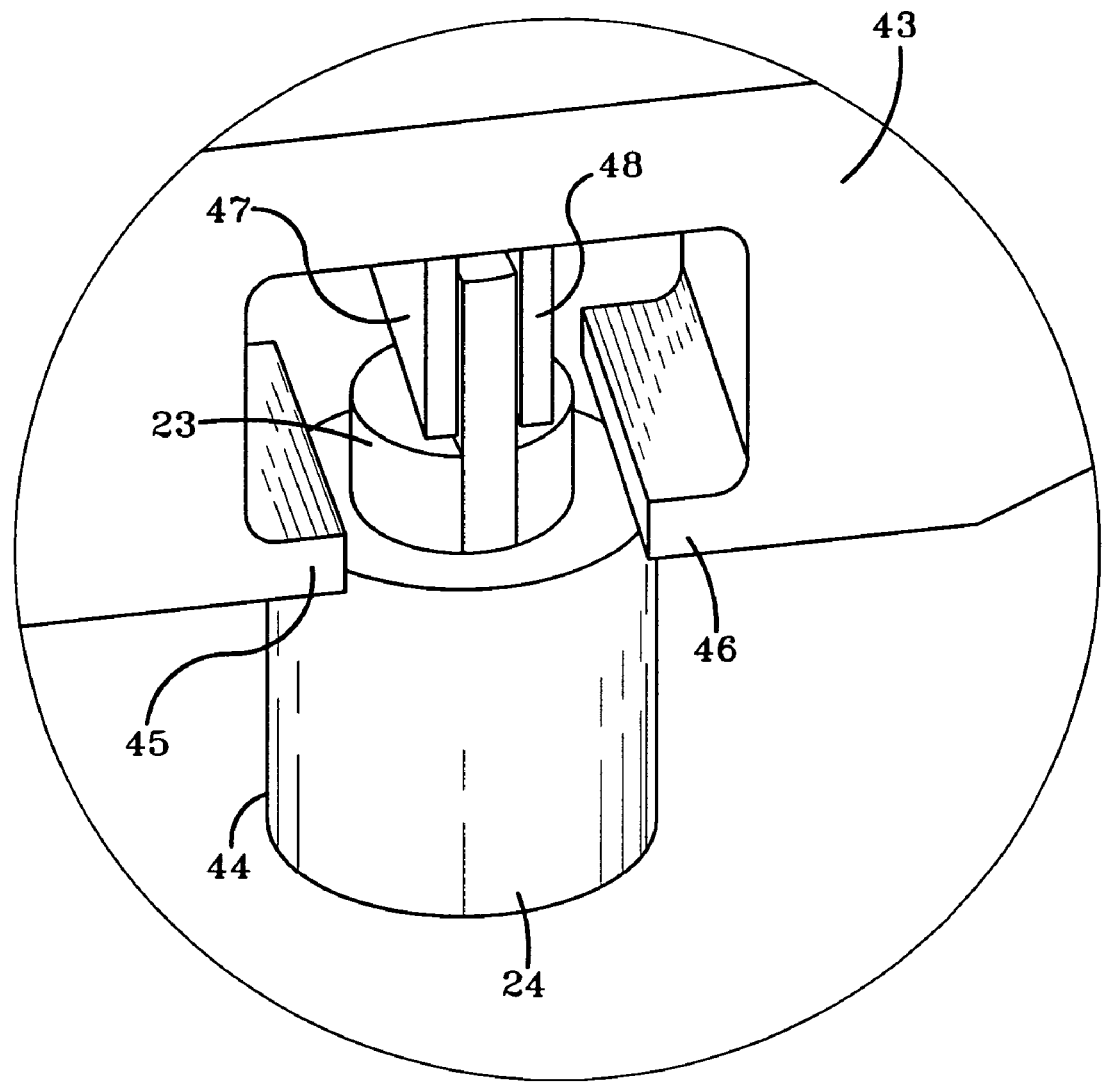
FIG. 3 is a close-up view of a portion of FIG. 2.

FIG. 3 illustrates the recess 44 in more detail. It shows two gripping claws 47, 48 at the upper edge, which hold onto the carrier bracket 23 located on the top of the sensor node 24, before the deployment of the sensor node 24. The gripping claws 47, 48 are releasable by remote control, and are released after the lower part of the sensor node 24 has been forced into the seabed.

Between the arm pair 38, 39 at the other end of the deployment frame 34, is arranged a thruster unit 49 located within a tube 50 having a traverse axis with regard to the longitudinal axis of the deployment frame. This can be operated in cases where one desires to change the compass direction of the deployment frame 34, for instance, when deploying in an area with a current, where one can make the deployment frame less exposed to currents.

To position and orientate the deployment frame 34, and thus the sensor node 24 correctly, different equipment is required that reports the desired parameters, such as a tilting meter, for instance a gyro with a sensor for pitch, roll, and direction, an altimeter, and an acoustic position transponder. Furthermore, a video camera, a water depth meter, and a contact sensor for registering contact with the seabed can be installed.

For the deployment of the deployment frame 34 from a vessel, a line 51 is used. Above the deployment frame 34 it branches off into four branch lines 52, which each extend out to an attachment point 53 at the free end of each arm 36, 37, 38, 39. To ensure that the branch lines 52 stay clear off the deployment frame 34, a floating body (not shown) is arranged at the branch point 54.

The line 51 is attached to the branch point 54. The container 33 is attached to the deployment frame 34 with a releasable attachment arrangement, so that the deployment frame can be released before it is raised up again.

The active length of the legs 40 can be adapted so that the deployment frame rests against the seabed when a part of the skirt of the sensor node 24 has penetrated down into the loose floor mass.

This invention comprises a method for deploying sensor nodes where a sensor node is attached to a deployment frame and a container for containment of data registration equipment is lowered down into the sea. The deployment frame 34 is lowered until the sensor node 24 has penetrated down into the seabed. Then the shoe members 41, 42 of the deployment frame are lowered until they come into contact with the seabed, in a position that keeps the deployment frame horizontal. The sensor node and the container can then be released and the deployment frame can be raised up to a support vessel.

This invention also comprises a method for retrieving the deployment frame 34 after the sensor node 24 has been released. The shoe members 41, 42 of the deployment frame 34 are kept in contact with the seabed until the deployment frame has been lifted up from the container and the sensor node, to reduce the risk of altering the orientation of the sensor node.

Modifications

The deployment frame 34 can be modified in different ways, with more or fewer arms, or with a square or ring shape.

It is possible to attach a sensor that can detect the consistency of the seabed, for adapting the deployment of the legs to the requirements of the central element.

The flanges 45, 46 can have built-in force sensors, which register when the sensor node 24 touches the seabed, and measure the downward insertion force.

We claim:

1. An apparatus comprising:
   a sensor node (24) having a main body;
   a container (11; 33) that contains a data registration unit that is remotely controlled for registration of seismic data collected by the sensor node (24);
   a frame structure (12, 13; 34) that carries the container and that rests on the seabed;
   a lifting device (17; 51) that lifts and lowers the frame structure;
   a signal cable (32) that connects the sensor node to the container;
   a releasable fastener (22; 47, 48) that supports the sensor node (24) to the frame structure and releases the sensor node (24) after at least a portion of the main body of the sensor node is inserted into the seabed at a horizontal distance from the container (11; 33);
   a pair of carrier arms (20, 27) extending from opposite sides of the container (11) wherein each carrier arm has a support plate (29, 28) that contacts the seabed only when the sensor node (24) is inserted into the seabed;
   wherein the sensor node (24) is positioned juxtaposed to one support plate (29); and,
   wherein the other support plate (28) has an area-moment about a main axis that is approximately the sum of the area-moments of the support plate (29) and the sensor node (24).

2. The apparatus according to claim 1 wherein the releasable fastener comprises a latch pin (25) that is moveable with respect to the carrier arms and received in a carrier bracket (23) mounted to the sensor node (24).

3. The apparatus according to claim 1 wherein the releasable fastener comprises a pair of claws (47, 48).

4. The apparatus according to claim 1 wherein the releasable fastener (22; 47, 48) positions the sensor node (24) into the seabed at a fixed horizontal distance from the container (11; 33).

5. An apparatus comprising:
   a sensor node (24) having a main body;
   a container (11; 33) that contains a data registration unit that is remotely controlled for registration of seismic data collected by the sensor node (24);
   a frame structure (12, 13; 34) that carries the container and that rests on the seabed;
   a lifting device (17; 51) that lifts and lowers the frame structure;
   a signal cable (32) that connects the sensor node to the container; and,
   a releasable fastener (22; 47, 48) that:
   a) supports the sensor node (24) to the frame structure at a fixed location with respect to the frame structure as the frame structure is lowered toward the seabed;
   b) maintains the sensor node (24) at the fixed location as at least a portion of the main body of the sensor node is inserted into the seabed at a horizontal distance from the container (11; 33); and,
   c) releases the sensor node (24) after the at least a portion of the main body of the sensor node is inserted into the seabed.

6. The apparatus according to claim 5 wherein the releasable fastener (22) is arranged on a carrier arm (20), which extends laterally out from the container (11).

7. The apparatus according to claim 5 wherein the releasable fastener comprises a latch pin (25) that is moveable with respect to the carrier arm and received in a carrier bracket (23) mounted to the sensor node (24).

8. The apparatus according to claim 5 wherein the releasable fastener comprises a pair of claws (47, 48).

9. The apparatus according to claim 5 wherein the releasable fastener (22; 47, 48) positions the sensor node (24) into the seabed at a fixed horizontal distance from the container (11; 33).

* * * * *